(12) United States Patent
Lee et al.

(10) Patent No.: US 10,648,526 B2
(45) Date of Patent: May 12, 2020

(54) STOPPER FOR TRANSMISSION MOUNT (71) Applicants: HYUNDAI MOTOR COMPANY, Seoul (KR); KIA Motors Corporation, Seoul (KR); PYUNG HWA INDUSTRIAL CO., LTD., Daegu (KR)

(72) Inventors: Kwan-Ho Lee, Hanam-si (KR); Yong-Hee Hahn, Suwon-si (KR); Hee-Sung Lee, Suwon-si (KR); Jong-Su Park, Daegu (KR)

(73) Assignees: HYUNDAI MOTOR COMPANY, Seoul (KR); KIA MOTORS CORPORATION, Seoul (KR); PYUNG HWA INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 16/124,102

(22) Filed: Sep. 6, 2018

(65) Prior Publication Data
US 2019/0154097 A1    May 23, 2019

(51) Int. Cl.
*F16F 1/371* (2006.01)
*F16F 1/377* (2006.01)
(Continued)

(52) U.S. Cl.
CPC .............. *F16F 1/371* (2013.01); *F16F 1/377* (2013.01); *F16H 57/025* (2013.01);
(Continued)

(58) Field of Classification Search
CPC combination set(s) only.
See application file for complete search history.

(56) References Cited

U.S. PATENT DOCUMENTS 5,024,425 A * 6/1991 Schwerdt ............ F16F 13/1481
                                                                180/312
5,842,687 A * 12/1998 David ................... F16F 1/3835
                                                                267/140.5

(Continued)

FOREIGN PATENT DOCUMENTS

JP     10-2014-0050850 A    2/2014
KR       10-1165211 B1      7/2012
(Continued)

*Primary Examiner* — Monica E Millner
(74) *Attorney, Agent, or Firm* — Knobbe Martens Olson & Bear LLP (57) ABSTRACT

The present disclosure relates to a transmission (TM) mount that is capable of reducing costs and a weight by removing a separate stopper (component). The transmission (TM) mount improves handling performance taking advantage of elastic properties of a rubber component in a left/right direction (lateral direction). The stopper for a transmission (TM) mount includes a housing bracket into which an insulator is press-fitted, a lower plate which is positioned at a lower end of the insulator and connected, together with the housing bracket, to a vehicle body through a curling structure, an inner core which is disposed at a central portion of the insulator, and a bridge which is installed at a lower side of the inner core so as to control a lateral displacement. The bridge is tightly fixed to a fixing piece formed in the lower plate.

4 Claims, 7 Drawing Sheets

(51) Int. Cl.
*F16H 57/025* (2012.01)
*F16H 57/028* (2012.01)
*F16H 57/02* (2012.01)

(52) U.S. Cl.
CPC ...... *F16H 57/028* (2013.01); *F16F 2224/025* (2013.01); *F16F 2226/045* (2013.01); *F16F 2232/08* (2013.01); *F16H 2057/02043* (2013.01)

(56) References Cited

U.S. PATENT DOCUMENTS

| | | | | |
|---|---|---|---|---|
| 6,105,944 | A * | 8/2000 | David | F16F 1/387 |
| | | | | 267/140.11 |
| 9,523,464 | B2 * | 12/2016 | Kashihara | F16M 13/02 |
| 9,551,396 | B2 * | 1/2017 | Yoshii | F16F 1/371 |
| 9,926,999 | B2 * | 3/2018 | Kadowaki | B60K 5/1216 |
| 9,933,038 | B2 * | 4/2018 | Kojima | F16F 13/14 |
| 10,185,370 | B2 * | 1/2019 | Tan | F16B 5/0241 |
| 10,208,847 | B1 * | 2/2019 | Lee | F16F 1/3713 |
| 10,337,585 | B2 * | 7/2019 | Kojima | F16F 1/36 |
| 2012/0146271 | A1 * | 6/2012 | Kato | F16F 1/3849 |
| | | | | 267/293 |
| 2013/0153741 | A1 * | 6/2013 | Pichel | F16F 15/08 |
| | | | | 248/634 |
| 2014/0159290 | A1 * | 6/2014 | Kojima | F16F 13/18 |
| | | | | 267/140.13 |
| 2015/0129742 | A1 * | 5/2015 | Okanaka | B60K 5/1208 |
| | | | | 248/634 |
| 2015/0276010 | A1 * | 10/2015 | Nakamura | F16F 15/08 |
| | | | | 248/634 |
| 2016/0053848 | A1 * | 2/2016 | Nakamura | F16F 1/3842 |
| | | | | 248/634 |
| 2017/0211648 | A1 * | 7/2017 | Kadowaki | F16F 1/36 |

FOREIGN PATENT DOCUMENTS

| | | |
|---|---|---|
| KR | 10-1256860 B1 | 4/2013 |
| KR | 10-1823904 B1 | 1/2018 |

* cited by examiner

STOPPER FOR TRANSMISSION MOUNT

CROSS-REFERENCE TO RELATED APPLICATIONS

This application claims priority under 35 U.S.C. § 119 to Korean Patent Application No. 10-2017-0154054, filed on Nov. 17, 2017, with the Korean Intellectual Property Office, the disclosure of which is incorporated herein by reference in its entirety.

BACKGROUND

1. Field

The present disclosure relates to a stopper structure for a transmission (TM) mount which is mounted on a vehicle body and supports a load of a transmission. Particularly, the present disclosure relates to a stopper for a TM mount which is capable of reducing costs and a weight by removing an existing separate stopper (component), and improving an additional handling performance by improving spring properties of a rubber in a left and right direction in comparison with the existing technology.

2. Description of Related Art

A monocoque body, which is light in weight and excellent in productivity, is mainly used for a passenger vehicle instead of a frame body. The monocoque body has a structure from which a separate frame is removed, and a power train (which includes an engine and a transmission coupled to each other) is mounted directly to a vehicle body.

Therefore, in the case of the monocoque body, the vehicle body itself functions as a frame, such that suspension components and chassis components are mounted on the vehicle body, and sub-frames and mounting members are mounted at a lower side of the vehicle in order to prevent vibration of the power train from being transmitted directly to the vehicle body and disperse impacts at the time of a vehicle collision.

The sub frame is mounted at a lower side of the vehicle body so that a steering system and a suspension system such as a suspension strut and a knuckle may be connected to the sub frame. Further, the mounting members include an engine mount which is fixed to a vehicle body member at one side and fastened to the engine, a TM mount (transmission mount) which is fixed to a vehicle body member at the other side and fastened to the transmission, and roll rods which fasten the engine or the transmission to the sub frame.

Therefore, the TM mount supports a load of the power train at a side of the transmission, and has a vibration insulating function so as to prevent vibration from being transmitted to the vehicle body from the power train.

SUMMARY

Figure 1:
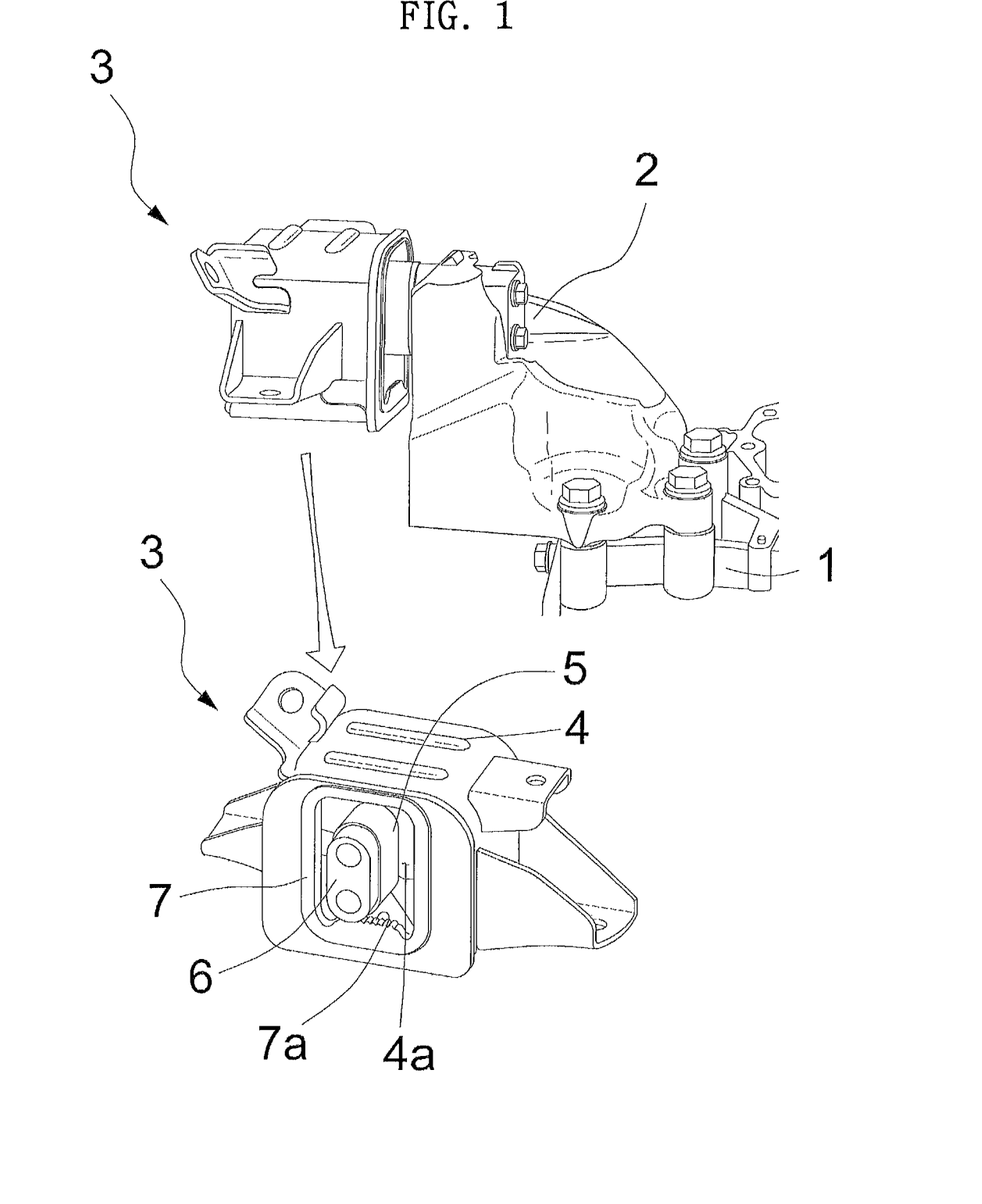
FIG. 1 is a view illustrating a stopper for a rubber type TM mount.

Referring to FIG. 1, in the case of a structure of a rubber type TM mount 3, an insulator 5 made of a material (e.g., rubber or synthetic resin, etc.) having elasticity is coupled to a metallic inner core 6 and embedded, together with the inner core 6, in a housing bracket 4 having a predetermined size and a container shape. One end of the inner core 6 protrudes through an opening 4a formed at one side of the housing bracket 4 (at a side directed toward a transmission bracket when the inner core 6 is mounted on the vehicle body). A bolt hole is formed at an end of the inner core 6, and the inner core 6 is fastened, by bolting, to the transmission bracket 2 coupled to the transmission 1, supports a load of the power train at the side of the transmission, and insulates vibration as the insulator 5 is elastically deformed.

A stopper 7 is additionally mounted in order to prevent damage to the insulator 5 and the housing bracket 4 which is caused by a rapid change in load being transmitted to the insulator 5 in accordance with a traveling situation of the vehicle.

The stopper 7 has a ring shape that communicates with the opening 4a, the stopper 7 is attached and mounted at the periphery of a rim of the opening 4a, and ribs 7a, which protrude upward, are formed on a lower end of the stopper 7 to prevent the core 6 from being moved downward to a predetermined distance or more, thereby inhibiting the insulator 5 from being excessively deformed elastically.

The stopper in FIG. 1 may control only the downward movement of the core and thus contribute to durability of the insulator in the up and down direction, but there is a problem in that the stopper cannot control a load in a vehicle width direction (left and right direction) which is caused by a gap between the transmission bracket and the housing bracket, which may adversely affect a handling performance of the vehicle.

A separate stopper is mounted outside the TM mount by bonding to control a displacement of the power train at the time of handling the vehicle, thereby improving integrity between the power train and the vehicle body and improving handling responsiveness and vehicle conformability at the time of rapidly steering the vehicle. However, there is a problem in that bonded parts (attached parts) are weakened due to an operation of frequently turning the vehicle, and as a result, attachment durability significantly deteriorates.

The TM mount insulator is fixed to the housing bracket, and the housing bracket is coupled to the vehicle. In this case, the mount insulator connects the mount bracket and the power train PT, and a lower bridge formed integrally with the insulator is made of rubber, thereby supporting a load of the power train and insulating vibration. The bridge consequently generates a PT flow while being deformed in accordance with the PT flow, and the PT flow moves opposite to the motion of the vehicle when the PT flow is excessive when the vehicle turns, which decreases integrity and adversely affects handling conformability at the time of rapidly steering the vehicle based on the action-reaction law.

To solve the aforementioned problems, Korean Patent Application No. 10-2016-0084553 entitled "Stopper for TM Mount" has been filed.

A main purpose of the stopper for the TM mount is that a separate stopper is mounted outside (bonded or fixed into) the TM mount to control a displacement of the power train at the time of handling the vehicle, thereby improving integrity of the power train and the vehicle body and improving handling responsiveness and vehicle conformability at the time of rapidly steering the vehicle.

However, there is concern that mixing noise occurs between the stopper and the TM bracket at the time of rapidly steering the vehicle, and as a result, there is a problem in that because of weakened bonding, it is difficult to apply a rubber material having a self-lubricating performance to the stopper for the TM mount for solving a problem of abnormal noise.

There is a problem in that the separate stopper is separated from the bracket due to the operation of turning the vehicle after the bonding process as described above.

There is a problem in that costs and a weight increase at the time of fixing the rubber stopper with internal curling.

In the case of the stopper attached outside the TM mount, there is a problem in that there is a severe deviation in terms of handling performance effects in accordance with an external shape of the TM bracket.

Therefore, there is an acute need for an invention related to a structure capable of controlling a displacement in the TM mount.

The present disclosure has been made in an effort to remove the existing separate stopper, change shapes of a core and a lower plate which are structures in an insulator, and implement a function of a stopper in a lateral direction which has been performed by the existing separate stopper and a power train bracket.

The present disclosure has also been made in an effort to improve a problem with quality such as abnormal noise of a mount by allowing a function, which has been performed by the existing outer stopper, to be performed in an insulator in order to improve handling performance.

An embodiment of the present disclosure provides a stopper for a TM mount, including: a housing bracket into which an insulator is press-fitted; a lower plate which is positioned at a lower end of the insulator and connected, together with the housing bracket, to a vehicle body through a curling structure; an inner core which is disposed at a central portion of the insulator; and a bridge which is installed at a lower side of the inner core so as to control a lateral displacement, in which the bridge is fixed to a fixing piece formed in the lower plate.

According to certain embodiments of the present invention, the following effects may be obtained.

First, it is possible to reduce costs and a weight by removing the existing separate stopper (component) and improve an additional handling performance by improving spring properties of a rubber in a left and right direction in comparison with the existing technology.

Second, it is possible to improve a problem with quality such as abnormal noise of a mount by allowing a function, which has been performed by the existing outer stopper, to be performed in an insulator in order to improve handling performance.

Third, when the vehicle turns to the right, the inner core connected to the bracket is moved to the left, and the rubber between the lower plate and the core, which are made of a steel material, is compressed, such that the inner core is controlled so that the inner core is not moved any further, and as a result, it is possible to improve integrity between the power train and the vehicle body and improve a vehicle handling performance.

BRIEF DESCRIPTION OF THE DRAWINGS

FIGS. 4A to 4H are views for comparing an inner core and a lower plate according to an embodiment of the present invention with an inner core and a lower plate of the rubber type TM mount of FIG. 1.

DETAILED DESCRIPTION

Hereinafter, embodiments of the present invention will be described in detail with reference to the accompanying drawings so that those skilled in the art to which the present invention pertains may easily carry out the present invention. However, embodiments of the present invention may be implemented in various different ways, and is not limited to embodiments described herein.

A part irrelevant to the description will be omitted to clearly describe embodiments of the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

The present disclosure relates to a stopper for a TM mount which is mounted on the TM mount and prevents an insulator 10 coupled to an inner core 40 from being excessively deformed elastically. Hereinafter, an embodiment of the present invention will be described with reference to the drawings.

Figure 3:
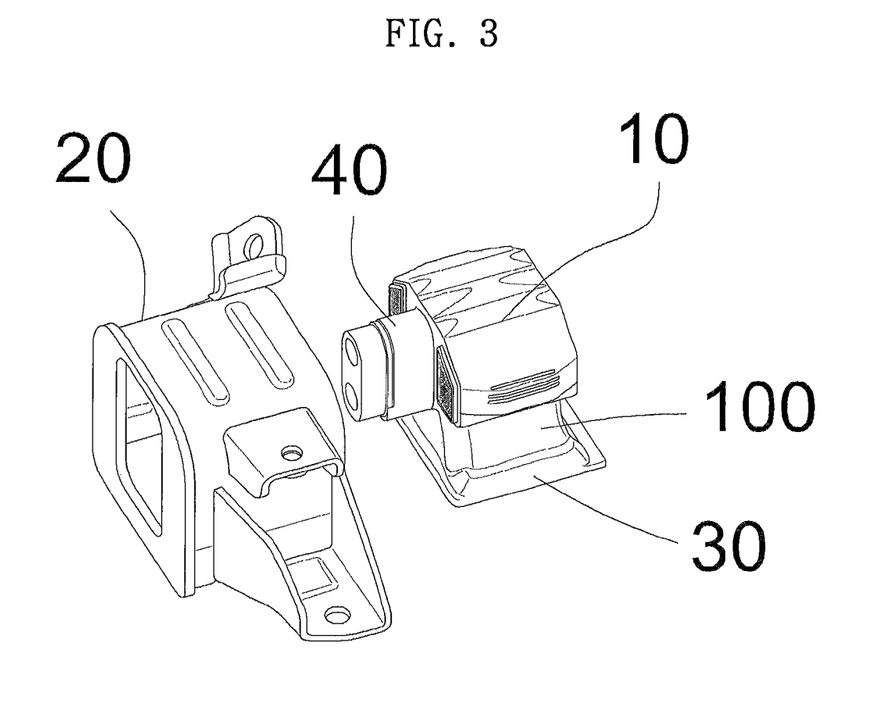
FIG. 3 is an exploded perspective view of a stopper for a TM mount according to an embodiment of the present invention.

As illustrated in FIG. 3, a certain embodiment of the present invention roughly includes the insulator 10, a housing bracket 20, a lower plate 30, the inner core 40, and a bridge 100.

The housing bracket 20 according to an embodiment of the present invention has a configuration in which in a housing having a predetermined size and a container shape, the insulator 10 made of a material having elasticity and the inner core 40 made of a metal material (aluminum) are vulcanized.

However, according to an embodiment of the present invention, the separate stopper in the related art is removed, and shapes of the inner core 40 and the lower plate 30, which are structures in the insulator 10, are changed, such that the inner core 40 and the lower plate 30 may perform a function of a stopper in a row direction, which has been performed by the separate stopper and the power train bracket in the related art.

Figure 2:
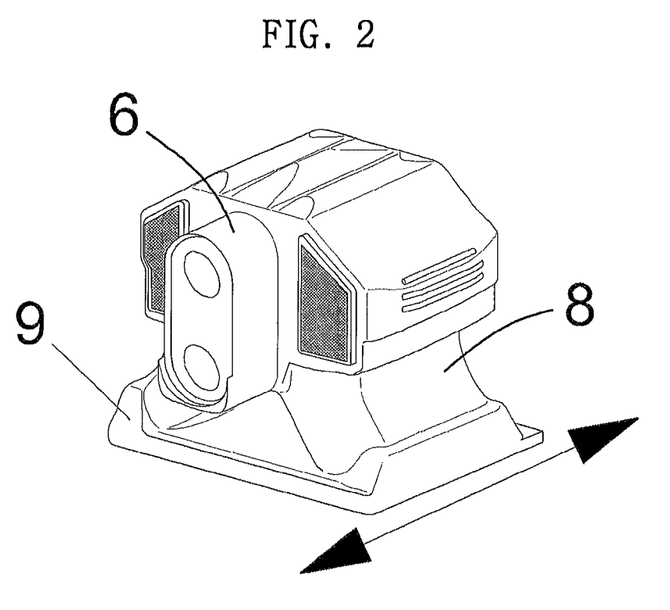
FIG. 2 is a perspective view illustrating a state in which an insulator bridge, which constitutes the stopper for the TM mount in the related art, is installed on a lower plate.

That is, the existing inner core 6 has a shape just for setting properties of a rubber of the insulator bridge 8 and serves to adjust property ratios in an up and down direction and a front and rear direction, and the lower plate 9 simply serves to support the inner core 6 and the insulator bridge 8, but as illustrated in FIG. 2, there is no protruding portion capable of controlling a lateral displacement in a direction indicated by the arrow.

Figure 4A:
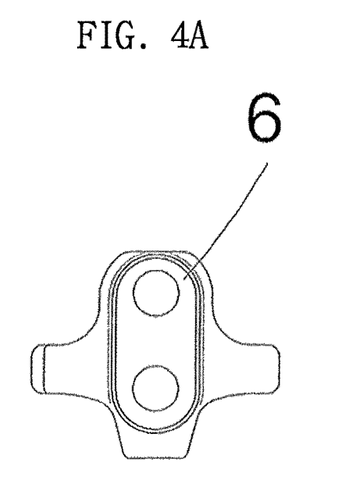
FIG. 4A is a front view of the inner core in the related art.
Figure 4B:
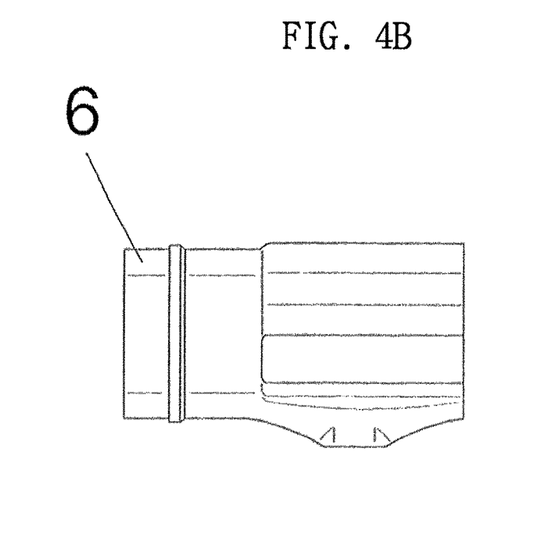
FIG. 4B is a side view of the inner core in the related art.
Figure 4C:
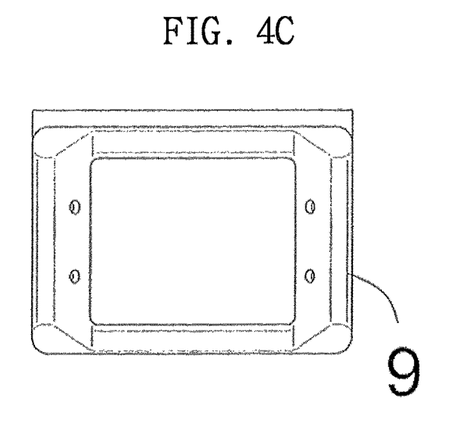
FIG. 4C is a top plan view of the lower plate in the related art.
Figure 4D:
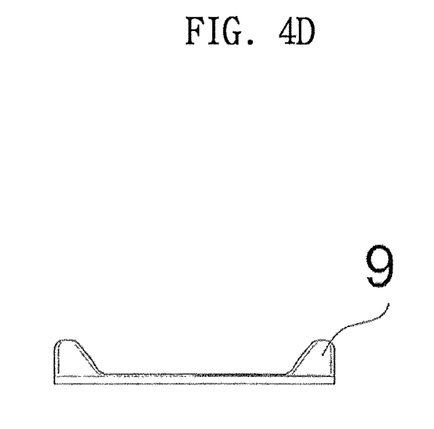
FIG. 4D is a bottom plan view of the lower plate in the related art.
Figure 4E:
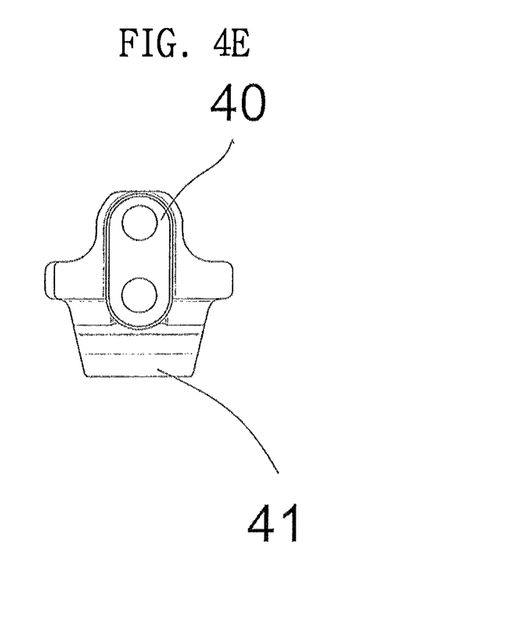
FIG. 4E is a front view of the inner core according to an embodiment of the present invention.
Figure 4F:
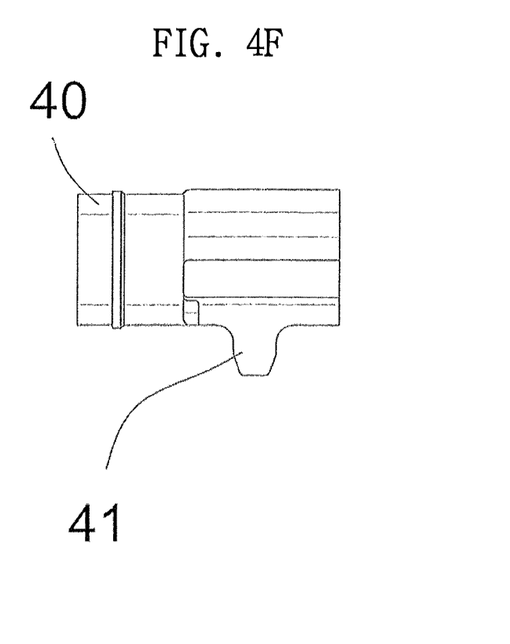
FIG. 4F is a side view of the inner core according to an embodiment of the present invention.
Figure 4G:
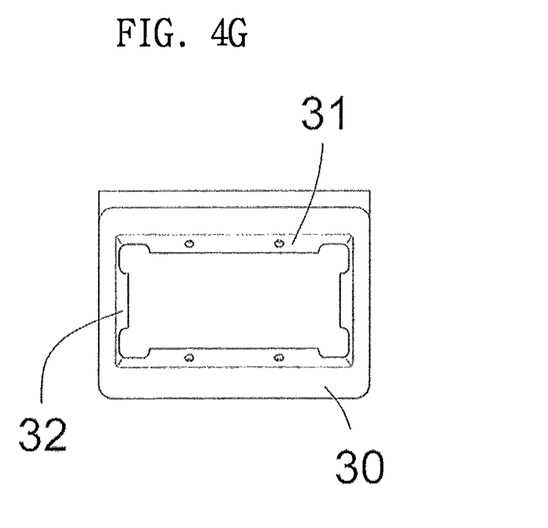
FIG. 4G is a top plan view of the lower plate according to an embodiment of the present invention.
Figure 4H:
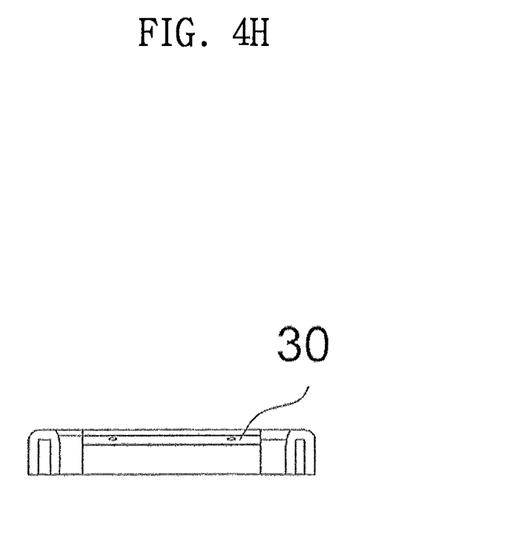
FIG. 4H is a bottom plan view of the lower plate according to an embodiment of the present invention.
Figure 5:
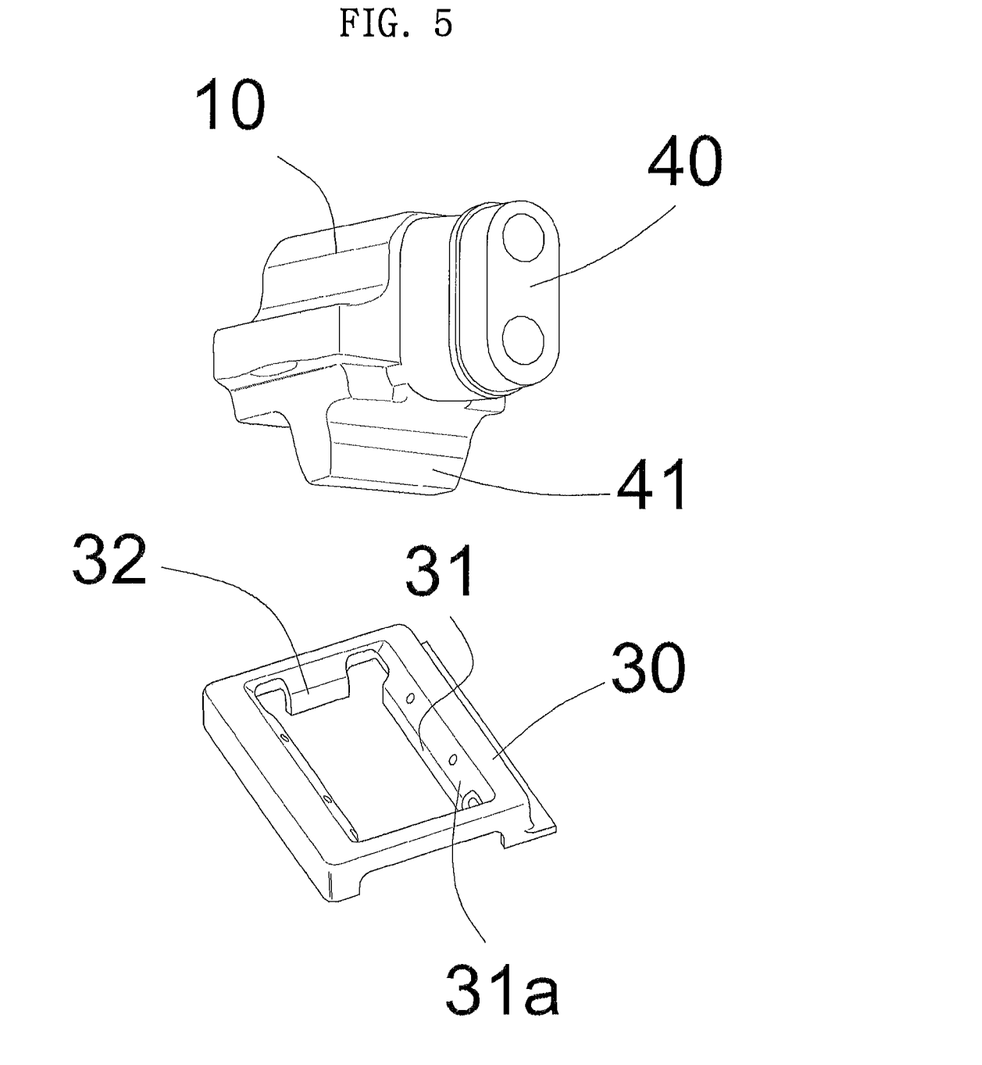
FIG. 5 is a perspective view illustrating the inner core and the lower plate according to an embodiment of the present invention.

Therefore, to solve the problems in the related art, according to an embodiment of the present invention, as illustrated in FIG. 4G or 5, the lower plate 30 has a rectangular metal frame shape and has support pieces 32 and fixing pieces 31, each of which has therein an inclined surface 31a in order to control the movement of the inner core 40 in a left and right direction.

The support piece 32 may control a lateral displacement that occurs in a lateral direction. In the case of the fixing piece 31, when the vehicle turns to the right, the inner core 40 connected to the housing bracket 20 is moved to the left, and the rubber bridge 100 formed between the lower plate 30 and the inner core 40, which are made of a metal material, is compressed, such that the inner core 40 is controlled so that the inner core 40 is not moved in the lateral direction any further.

Figure 6:
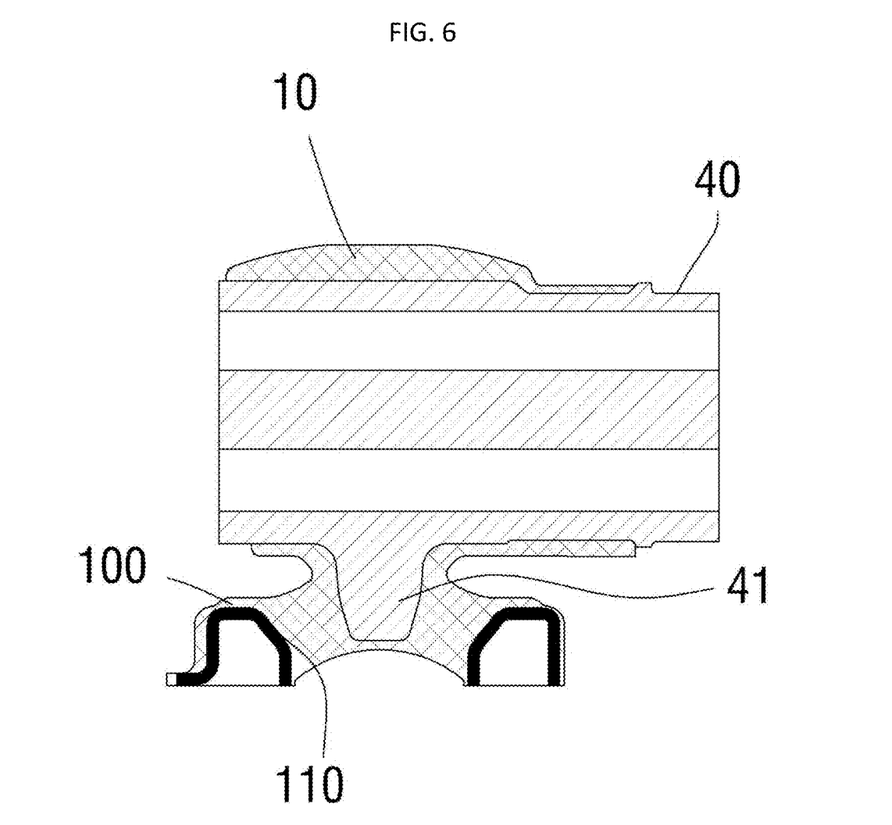
FIG. 6 is a cross-sectional view illustrating a state in which the inner core and a bridge, which constitute the insulator according to an embodiment of the present invention, are vulcanized.

As illustrated in FIG. 6, the bridge 100 coupled to the lower plate 30 is made of a rubber material, and a reinforcing material 110 having an inclined surface is inserted into a lower portion of the bridge 100 to satisfy properties and durability of the bridge.

The bridge 100 consequently generates a power train (hereinafter, referred to as PT) flow while being deformed in accordance with the PT flow, the PT flow is excessive when the vehicle rapidly turns, and the PT flow moves opposite to the motion of the vehicle, which decreases integrity and adversely affects handling conformability at the time of rapidly steering the vehicle based on the action-reaction law.

Therefore, according to an embodiment of the present invention, since the reinforcing material 110 having the inclined surface is inserted, a function, which has been performed by the separate stopper in the related art, is performed in the insulator 10 in order to improve the handling performance, and as a result, it is possible to solve the problem with quality such as abnormal noise of the mount.

A support portion 41, which is fixed to the bridge 10Q by vulcanization, elongates and protrudes from a lower portion of the inner core 40, such that coupling force of the inner core 40, control of a lateral displacement, and spring properties in the left and right direction are improved, thereby improving handling integrity.

In more detail, according to an embodiment of the present invention, when the vehicle turns to the right, the inner core 40 connected to the bracket is moved to the left, and the rubber (bridge) between the lower plate 30 and the inner core 40, which are made of a steel material, is compressed, such that the inner core 40 may be controlled so that the inner core 40 is not moved any further. As a result, it is possible to improve integrity between the power train and the vehicle body and improve the vehicle, handling performance.

While embodiments of the present invention has been described with reference to the drawings, different embodiments may be implemented within the spirit and the scope of the present invention. Therefore, it should be construed that the scope of the present invention is defined by the appended claims, and is not limited to a particular embodiment disclosed in the present specification.

What is claimed is:

1. A stopper for a transmission (TM) mount, comprising:
a housing bracket into which an insulator is press-fitted;
a lower plate which is positioned at a lower end of the insulator and connected, together with the housing bracket, to a vehicle body through a curling structure;
an inner core which is disposed at a central portion of the insulator; and
a bridge which is installed at a lower side of the inner core so as to control a lateral displacement,
wherein the bridge is tightly fixed to fixing pieces formed in the lower plate,
wherein the lower plate is made of a metal material, and has support pieces and the fixing pieces which have inclined surfaces at four inner sides in order to control a movement of the inner core in a left and right direction.

2. The stopper of claim 1, wherein the bridge is made of a rubber material, and a reinforcing material having an inclined surface is inserted into a lower portion of the bridge in order to satisfy properties and durability of the bridge.

3. The stopper of claim 1, wherein a support portion, which has an inclined surface and is inserted into and fixed to the bridge, protrudes from a lower portion of the inner core.

4. The stopper of claim 1, wherein when a vehicle turns to the right, the inner core connected to the housing bracket is moved to the left, and the rubber bridge formed between the lower plate and the inner core, which are made of a metal material, is compressed, such that the inner core is controlled so that the inner core is not moved in a lateral direction any further.

* * * * *